US012706069B1

(12) United States Patent
Mo et al.

(10) Patent No.: US 12,706,069 B1
(45) Date of Patent: Aug. 11, 2026

(54) INFORMATION PROCESSING APPARATUS AND CONTROL METHOD

(71) Applicant: Lenovo (United States) Inc., Morrisville, NC (US)

(72) Inventors: Liheng Mo, Kanagawa (JP); Jacek Spiewla, Morrisville, NC (US)

(73) Assignee: Lenovo (United States) Inc.

( * ) Notice: Subject to any disclaimer, the term of this patent is extended or adjusted under 35 U.S.C. 154(b) by 0 days.

(21) Appl. No.: 19/174,033

(22) Filed: Apr. 9, 2025

(51) Int. Cl.

| | |
|---|---|
| ***G09G 5/10*** | (2006.01) |
| ***G01S 17/04*** | (2020.01) |
| ***G01S 17/06*** | (2006.01) |
| ***G01S 17/08*** | (2006.01) |
| ***G06F 3/01*** | (2006.01) |
| ***G06T 7/70*** | (2017.01) |

(52) U.S. Cl.
CPC ................ *G09G 5/10* (2013.01); *G01S 17/04* (2020.01); *G01S 17/06* (2013.01); *G01S 17/08* (2013.01); *G06F 3/011* (2013.01); *G06T 7/70* (2017.01); *G09G 2320/0626* (2013.01)

(58) Field of Classification Search
CPC .. G09G 5/10; G09G 2320/0626; G01S 17/04; G01S 17/06; G01S 17/08; G06F 3/011; G06T 7/70
See application file for complete search history.

(56) References Cited

U.S. PATENT DOCUMENTS

2021/0397248 A1* 12/2021 Landemaine ............ G06T 7/55
2024/0377539 A1* 11/2024 Lemarchand ...... G02B 27/0093

* cited by examiner

*Primary Examiner* — Cory A Almeida
(74) *Attorney, Agent, or Firm* — Osha Bergman Watanabe & Burton LLP

(57) ABSTRACT

An information processing apparatus includes a time-of-flight (ToF) sensor that obtains a plurality of measured distances by measuring a distance to each of a plurality of points within a field of view of the ToF sensor, a screen, and a controller. The controller detects a presence of a user within the field of view based on the plurality of measured distances. In response to detecting the presence of the user within the field of view, the controller classifies, using an artificial intelligence (AI) model, a posture of the user based on the plurality of measured distances, and adjusts a brightness of the screen based on the posture of the user.

14 Claims, 6 Drawing Sheets

INFORMATION PROCESSING APPARATUS AND CONTROL METHOD

BACKGROUND

Users increasingly rely on information processing apparatuses, such as computers, smartphones, tablets, and other devices throughout their daily routines. Their constant use and operation create a significant energy demand which may impact the environment as well as the longevity of the devices. Users may conserve energy by manually placing the device into a standby, or low-energy consuming state, when it is not in use and manually returning the information processing apparatus to an active, or medium-to-high energy state, as needed. However, manually adjusting and the operating state of the information processing apparatus throughout the day is burdensome and time consuming for the user.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to an information processing apparatus. The information processing apparatus includes a time-of-flight (ToF) sensor that obtains a plurality of measured distances by measuring a distance to each of a plurality of points within a field of view of the ToF sensor, a screen, and a controller. The controller detects a presence of a user within the field of view based on the plurality of measured distances. In response to detecting the presence of the user within the field of view, the controller classifies, using an artificial intelligence (AI) model, a posture of the user based on the plurality of measured distances, and adjusts a brightness of the screen based on the posture of the user.

In general, in one aspect, embodiments relate to a method. The method includes obtaining, using a time-of-flight (ToF) sensor of an information processing apparatus, a plurality of measured distances by measuring a distance to each of a plurality of points within a field of view of the ToF sensor, and detecting a presence of a user within the field of view of the ToF sensor based on the plurality of measured distances. The method further includes, in response to detecting the presence of the user within the field of view, classifying, using an AI model, a posture of the user based on the plurality of measured distances, and adjusting a brightness of a screen of the information processing apparatus based on the posture of the user.

DETAILED DESCRIPTION

Figure 1:
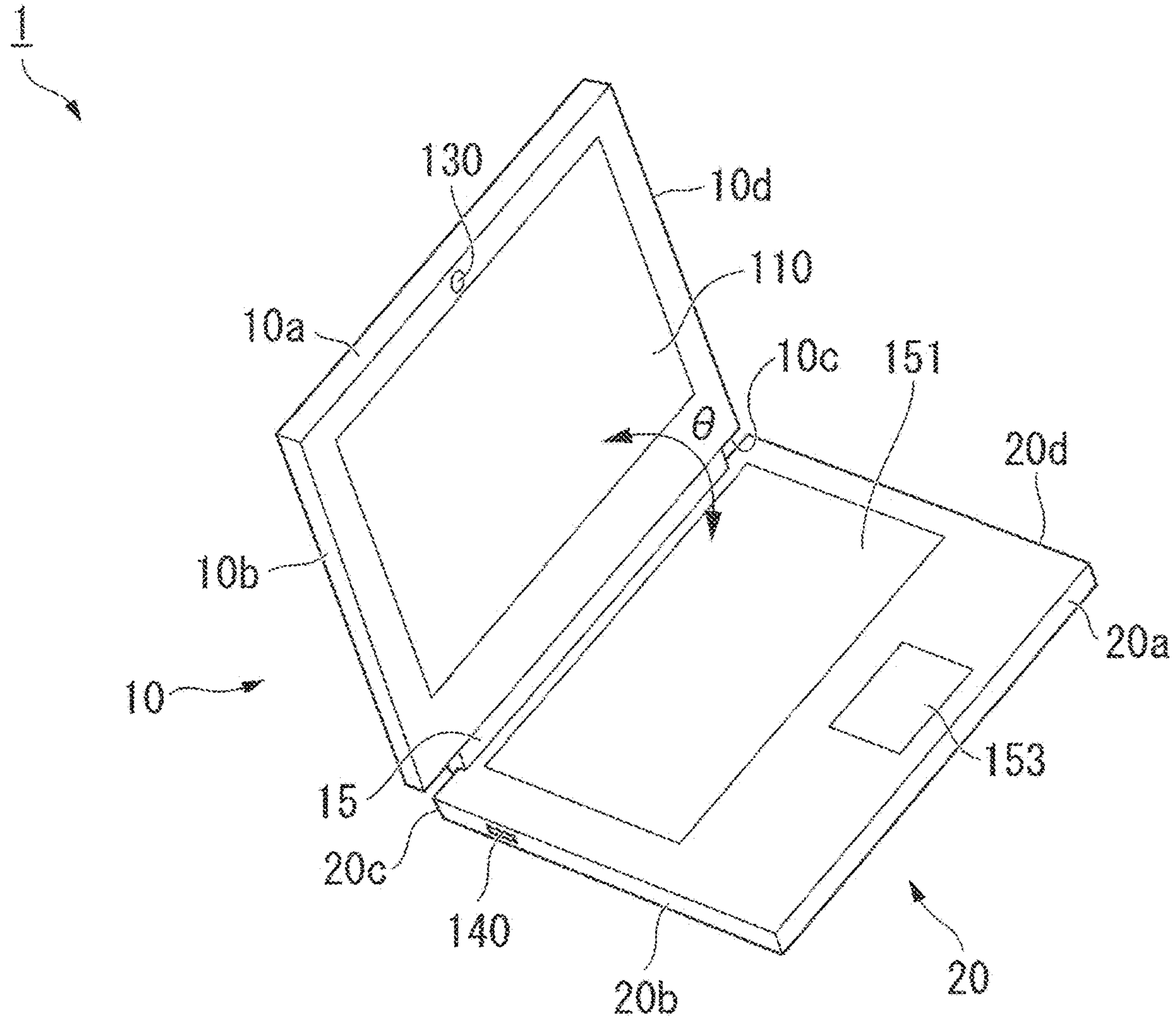
FIG. 1 depicts an information processing apparatus according to one or more embodiments of the disclosure.

Specific embodiments of the present disclosure will now be described in detail below with reference to the accompanying drawings. Like elements in the various figures are denoted by like reference numerals for consistency.

In the following detailed description of embodiments of the disclosure, numerous specific details are set forth to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third) may be used as an adjective for an element (e.g., any noun in the application). The use of ordinal numbers is not intended to imply or create a particular ordering of the elements nor to limit any element to being only a single element unless expressly disclosed, such as using the terms "before," "after," "single," and other such terminology. Rather the use of ordinal numbers is to distinguish between the elements. By way of an example, a first element is distinct from a second element, and the first element may encompass more than one element and may succeed (or precede) the second element in an ordering of elements.

Conventional information processing apparatuses include personal computers like desktop computers and laptop/notebook computers, smart phones, personal data assistants (PDAs), and tablet computing devices. Modern business, education, and entertainment increasingly rely on such information processing apparatuses, and therefore their energy demand is high and continues to grow. However, information processing apparatuses typically do not consume energy uniformly over time. Instead, their energy demand is punctuated by the interactions of the user with the information processing apparatus, with higher energy demand coinciding with greater levels of user interaction. As such, a user may manually adjust an operating state of an information processing apparatus (e.g., fan speed, processing rate, data download, background activity, screen brightness, etc.) to lower energy consumption when it is not needed.

Embodiments of the present disclosure provide an information processing apparatus that uses a time-of-flight (ToF) sensor to automatically adjust the operating state of the information processing apparatus. The ToF sensor measures the distance to a plurality of points within its field of view to characterize user interaction. ToF sensors can be used to measure distances by emitting a pulse (e.g., of radiation or sound) and detecting a reflected signal that is reflected by objects within the direction of the emitted pulse. The distance to the object is determined from the time between emission of the pulse and detection of the reflected signal. ToF sensors use considerably less power than camera systems and can be operated with high cycling frequency, providing dynamic and real-time response in characterizing user activity.

FIG. 1 depicts an information processing apparatus (1) according to one or more embodiments of the disclosure. In particular, FIG. 1 shows a perspective view of the information processing apparatus (1). The information processing apparatus (1) is, for example, a laptop PC (Personal Computer). A person of ordinary skill in the art will appreciate that although the information processing apparatus (1) as depicted in FIG. 1 is a laptop PC, in other embodiments, the information processing apparatus (1) may be of another type (e.g., a desktop computer, a smartphone, or a tablet, etc.).

The information processing apparatus (1) includes a first chassis (10) and a second chassis (20) joined by a hinge (15). The first chassis (10) is rotatable relative to the second chassis (20) around the rotation axis of the hinge (15). An angle between the first chassis (10) and the second chassis (20) is denoted by "0" in FIG. 1. The first chassis (10) may be referred to as an A cover or a display chassis, while the second chassis (20) may be referred to as a C cover or a system chassis. As depicted, the first chassis (10) and second chassis (20) each have a respective first side face (10*a*, 20*a*), second side face (10*b*, 20*b*), third side face (10*c*, 20*c*), and fourth side face (10*d*, 20*d*) defining an outer boundary of the information processing apparatus (1).

The information processing apparatus includes a power button (140) on the side face (20*b*) of the second chassis (20). The power button (140) is an element operated by the user transmit a command to the information processing apparatus (1) to power on or power off, transition from a standby state to a normal operating state, transition from the normal operating state to the standby state, or to activate another state.

A normal operating state is an operating state in which the information processing apparatus (1) is capable of processing data without particular limitation, for example, corresponding to the S0 state defined in the Advanced Configuration and Power Interface (ACPI) specification. A standby state is a state in which at least part of the system processing is limited, and power consumption is lower than that in the normal operating state. For example, the standby state may be a sleep state, modern standby in Windows™, or a state corresponding to S3 state (sleep state) defined in the ACPI specification. Additional examples of standby states include a state in which at least the screen (110) appears to be OFF, and in which the screen (110) displays a screen lock state that prohibits using the information processing apparatus (1) without first unlocking it.

The information processing apparatus (1) also includes a keyboard (151) and a touch pad (153) on the inner face of the second chassis (20) as an input device. The information processing apparatus may also include external connected devices (not shown) such as an external keyboard.

A screen (110) is provided on an inner face of the first chassis (10). The screen (110) may be a liquid crystal display (LCD) or an organic electroluminescence (EL) display, or another type of display. As depicted in FIG. 1, a ToF sensor (130) is disposed in a peripheral area of the screen (110) on the inner face of the first chassis (10). However, in other embodiments, the ToF sensor (130) may be disposed on another component of the information processing apparatus (1), for example, in the corners of the screen (110).

As described above, the ToF sensor (130) is a ranging sensor to measure the distance to an object present within the field of view of the ToF sensor (130), that is, in front of the information processing apparatus (1). In one or more embodiments, the ToF sensor (130) includes an infrared light source and an infrared light detector (not shown). The ToF sensor (130) emits infrared light from the infrared light source, and the infrared light is then reflected by object(s) within the field of view of the ToF sensor (130). The ToF sensor (130) emits infrared light with a predetermined sampling cycle (for example, 1-4 Hz) or frequency, and detects the reflected signal of the emitted infrared light to output a ranging signal. The distance to the object is then calculated by the speed of light multiplied by the time between emission and detection, divided by two, or:

$$d = \frac{ct}{2},$$

where d is the distance to the object, c is the speed of light, and t is the time between emission and detection.

Figure 2:
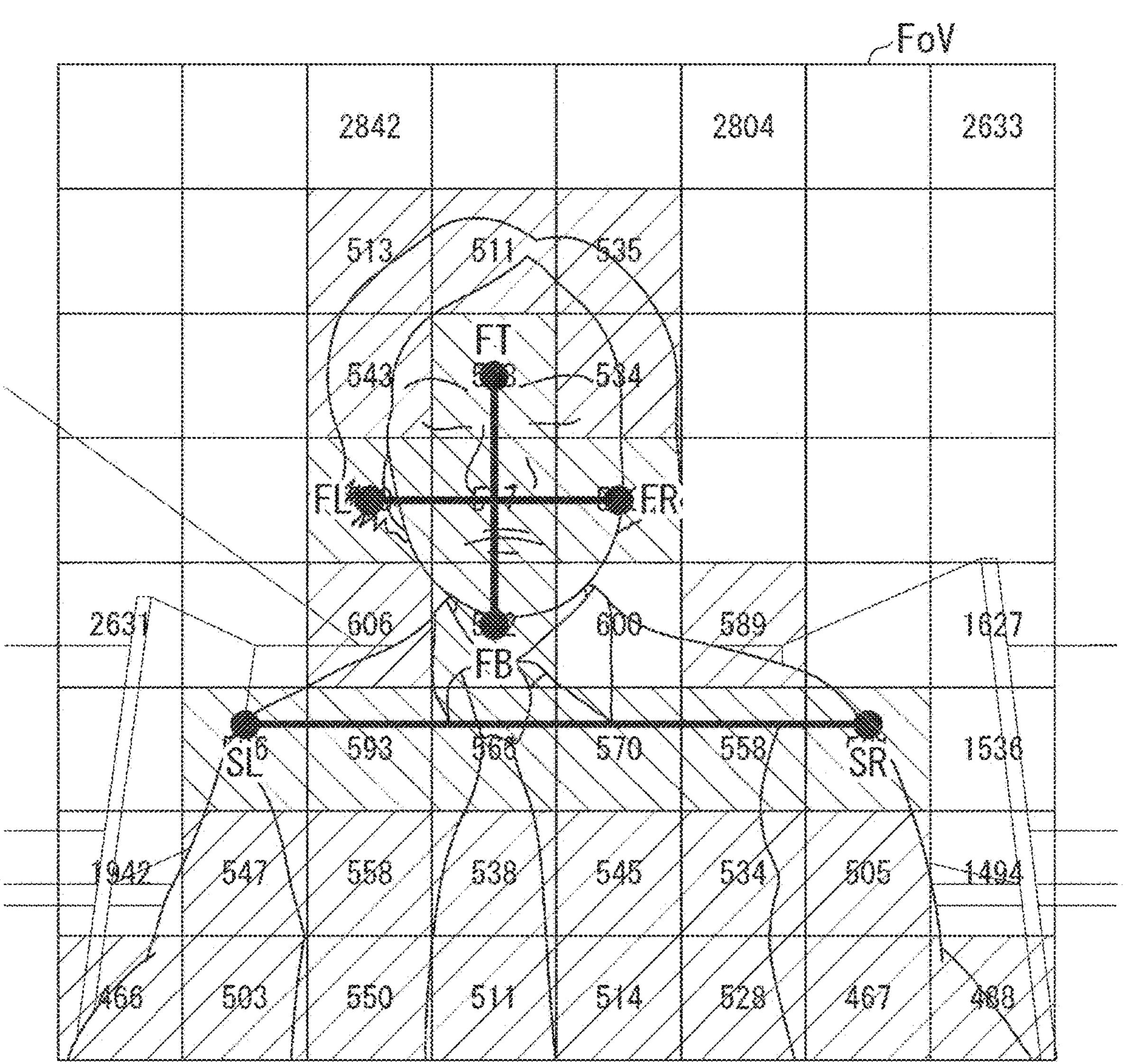
FIG. 2 depicts a user in an environment in accordance with one or more embodiments of the disclosure.

FIG. 2 is an illustration of a user of the information processing apparatus (1) in an environment in accordance with one or more embodiments. The ToF sensor (130) divides the field of view (FoV) of the ToF sensor (130) into subareas defined by the resolution of the ToF sensor (130). As depicted, the field of view of the ToF sensor (130) is divided into an area of 8×8 subareas. ToF sensors have different resolutions and fields of view, and depending on the type of ToF sensor (130) employed, the field of view of the ToF sensor (130) may be divided differently. For example, the extent of the field of view (130) in a horizontal direction may be greater than the extent in a vertical direction, or vice versa. Embodiments of the present disclosure include ToF sensors (130) that have better or worse resolution, and greater or smaller fields of view, than the ToF sensor (130) shown in FIG. 2.

As described above, embodiments disclosed herein include an information processing apparatus (1) with ToF sensor (130) that uses infrared light. However, one or more embodiments of the present disclosure may also include ultrasonic ToF sensors (130). Although ultrasonic ToF sensors are generally slower than light-based ToF sensors and have worse resolution, ultrasonic sensors perform well under different lighting settings, are less affected by the reflecting material, and are cost-effective to manufacture.

Continuing with FIG. 2, the detection range field of view is divided into 64-square measurement units of 8×8 squares, or subareas. The ToF sensor (130) measures a distance to a point or location within each subarea, obtaining a plurality of measured distances (i.e., one measurement for each subarea). To improve processing speeds, the ToF sensor (130) may use only a portion of the subareas containing the nearest points. For example, subareas that include distances to points that are beyond a predetermined threshold distance (e.g., 1-2 m) may be ignored. In addition, the ToF sensor (130) has a limited sensitivity. Consequently, objects beyond maximum threshold distance (e.g., 3 m) cannot be detected because their reflected light is too faint and dispersed.

In FIG. 2, a measured distance to a point or location within each subarea of the field of view is numerically overlaid on each subarea. The plurality of measured distances may be measured by the ToF sensor (130) with a predetermined sampling frequency (e.g., at 1, 0.5, or 0.25 second intervals, or 1-4 Hz). As objects within the FoV move, including the user, the measured distance value in each square changes. As described below, an operating state of the information processing apparatus (1) is controlled or adjusted based on the plurality of measured distances. Accordingly, the adjustment may be based on individual measurements obtained from a single cycle. Alternatively, or in addition, the information processing apparatus (1) or the ToF sensor (130) may calculate a summary statistic (e.g., the mean, median, mode, standard deviation, etc.) of the measured distances based on a predetermined number of cycles of measurements.

The measured distances illustrated in FIG. 2 are shown in millimeters. In this example, values of 450 to 610 demonstrate a range of distances in which the user is clearly identified. Subareas with measured distance values of 1000 or more correspond to the environment of the user, while subareas with no measured distance value represent areas or objects in the distance that are beyond the distance sensitivity of the ToF sensor (130).

The plurality of measured distances, and their distribution, encodes the orientation of the user within the field of view of the ToF sensor (130). In the illustrated example, six squares from a square marked with SL (Shoulder Left) to a square marked with SR (Shoulder Right) in the horizontal direction (the left and right direction) represent the width of the user's shoulders. As can be seen, the width of a part above the shoulder is narrower (e.g., 4 squares) than the shoulder width. The face of the user may be determined above the shoulder area and is even narrower (e.g., 3 squares) than the shoulder range.

The plurality of measured distances may also be used to determine different areas of the user's face. As illustrated, the square marked with FT (Face Top) shows a measured distance to a top part of the face (e.g., the user's forehead). Similarly, the square marked with FB (Face Bottom) shows a measured distance to a bottom part of the face (e.g., the user's chin); the square marked with FL (Face Left) on the left side shows a measured distance value of a right part of the user's face; and the square marked with FR (Face Right) shows a measured distance to a left part of the user's face.

Based on the plurality of measured distances corresponding to the user's face, the information processing apparatus (1) can detect the orientation of the user's face. For example, the orientation of the face in the vertical direction (up and down direction) is determined based on a difference between the measured distance to the top part and the measured distance value to the bottom part of the face. Similarly, the orientation of the face in the horizontal direction (left and right direction) is determined based on a difference between the measured distance value in to left part and the measured distance value to the right part of the face. A predetermined threshold value may be used to determine the direction the user is facing. In addition, the information processing apparatus (1) may also determine the orientation of the face depending on the measured distance that is the smallest or largest among the parts of the face. When the distances to each part of the user's face are approximately equal, (i.e., the difference between one or more pairs of distinct areas is less than a predetermined threshold), the user is facing the ToF sensor (130).

The same general technique may be used to determine and classify the posture of the user based on the plurality of measured distances obtained by the ToF sensor (130). The user illustrated in FIG. 2 is directly facing the information processing apparatus, sitting with shoulders mostly square and their head level. Such a posture is a "normal" posture as this is a common posture in which a user may interact with an information processing apparatus. In addition, the posture is considered normal or standard because the orientation of their face, among other characteristics of the user, can be properly measured. The posture of the user may be classified by identifying parts of the user's body as described above, such as their shoulder, neck, and limbs.

Figure 3:
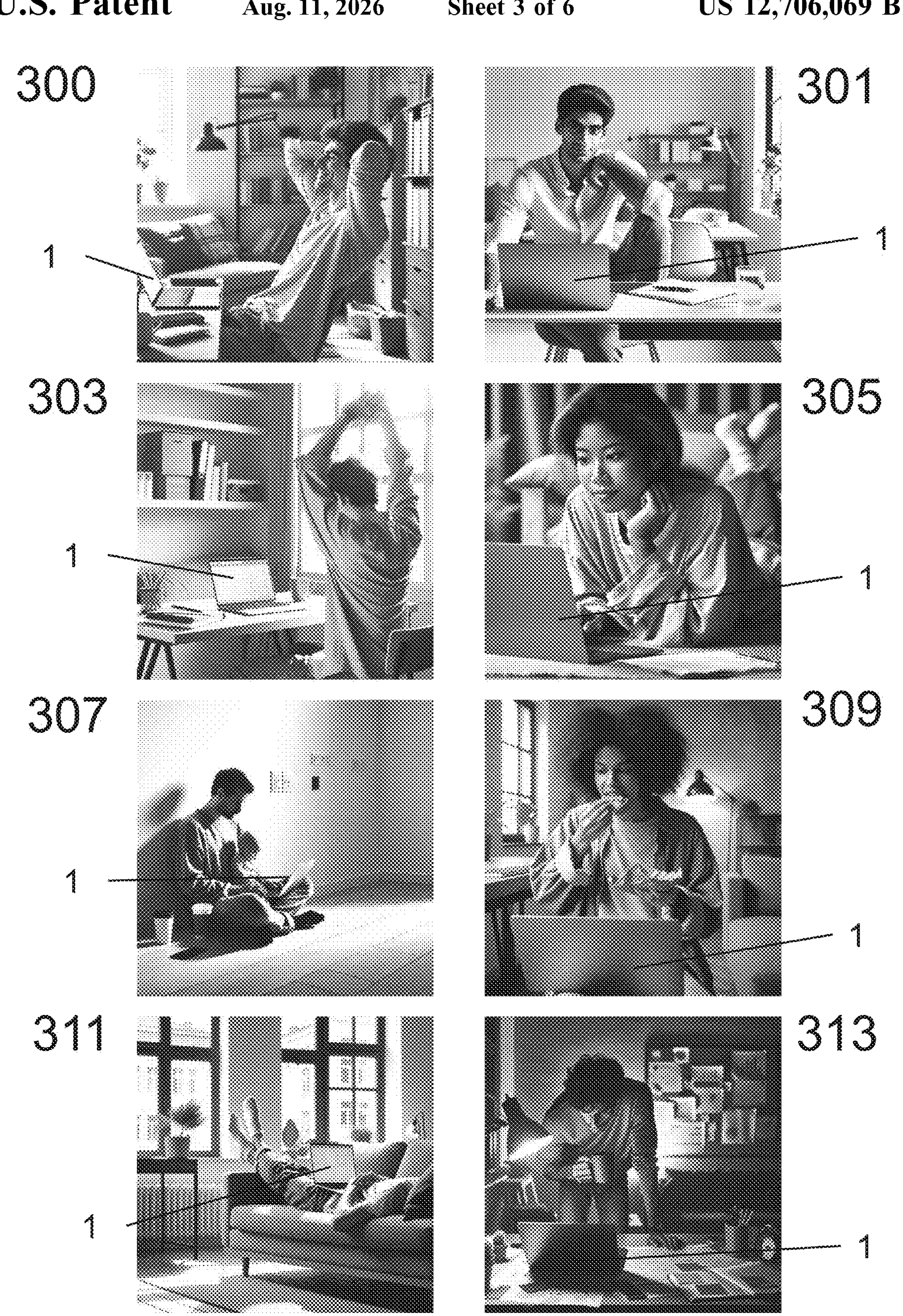
FIG. 3 depicts a plurality of users in accordance with one or more embodiments of the disclosure

FIG. 3 depicts a plurality of users interacting with an information processing apparatus (1) in a plurality of abnormal postures. Each user in FIG. 3 is interacting with the information processing apparatus (1) while in a different abnormal posture (300, 301, 303, 305, 307, 309, 311, 313). Some of the abnormal postures (300-313) may be categorized according to a shared characteristic. For example, abnormal posture (300) and abnormal posture (303) both depict a user stretching while interacting with the information processing apparatus (1). Similarly, both abnormal posture (301) and abnormal posture (311) depict a user reclining while using the information processing apparatus (1). In some instances, for example, in abnormal postures (301), (307), and (309), there is an obstruction between the information processing apparatus (1) and the user. Thus, compared to the user illustrated in FIG. 2, each posture (300-313) depicted in FIG. 2 may be considered abnormal because the user is interacting with the information processing apparatus (1) in an unconventional manner. Further, it may be difficult or inaccurate to attempt to determine the orientation of the user's face, or another characteristic of the user, when the user is in an abnormal posture. A person of ordinary skill in the art will recognize that additional abnormal postures are possible and those shown in FIG. 3 are not exhaustive.

Although it may be difficult to determine the orientation of the user's face when the user is in an abnormal posture, their abnormal posture may nonetheless be identified as such based on the plurality of measured distances obtained by the ToF sensor (130). That is, based on the plurality of measured distances, the posture of the user may be classified as either normal or abnormal. In one or more embodiments, a more refined classification of the user's posture may be determined, for example, depending on whether the user is reclining, stretching, standing, or whether there is an obstruction between the information processing apparatus, or whether there are multiple users within the field of view of the ToF sensor (130).

In accordance with one or more embodiments, the information processing apparatus (1) controls or adjusts the operating state of the system of the information processing apparatus (1) depending on the presence or absence of a person, their posture, the orientation of their face, or a combination of the three. For example, when a user is detected as present in front of the information processing apparatus (1), the information processing apparatus (1) adjusts the operating state to the normal operating state, or to another state. When the user is not detected in front of the information processing apparatus (1), the information processing apparatus (1) adjusts the operating state to the standby state.

The information processing apparatus (1) determines the direction of the user's face to provide greater sensitivity and selectivity over the control of the operating state. For example, in response to detecting that the user is present within the field of view of the ToF sensor (130), the information processing apparatus (1) subsequently attempts to determine the orientation of the user's face based on the plurality of measured distances. In response to determining that the user's face is oriented toward or away from the screen (110), the information processing apparatus (1) provides a further adjustment. For example, the information processing apparatus (1) controls the brightness of the screen (110) depending on whether or not the orientation of the face is towards or away from the screen (110). In response to determining to determining that the face of the user is oriented toward the screen (110), the information processing apparatus (1) increases or maintains the brightness of the screen (110).

In one or more embodiments, the user or manufacturer of the information processing apparatus (1) may configure the information processing apparatus (1) to set the brightness of the screen (110) to a predetermined brightness in response to determining that the face of the user is oriented toward the screen (110). Therefore, if the screen (110) is already at (or even above) the predetermined brightness, then the brightness of the screen (110) is maintained. Similarly, if the brightness of the screen (110) is already at a maximum value, then it cannot be increased and is instead maintained. If the brightness of the screen (110) is below the predetermined brightness, then brightness of the screen (110) is increased.

In response to determining that the face of the user is not oriented towards the screen (110), the information processing apparatus (1) reduces the brightness of the screen (110), thereby reducing energy consumption. In one or more embodiments, the user or manufacturer of the information processing apparatus (1) may configure the information processing apparatus (1) to set the brightness of the screen (110) to a second predetermined brightness in response to determining that the face of the user is oriented away from the screen (110). Therefore, if the screen (110) is already at (or even below) the second predetermined brightness, then the brightness of the screen (110) is maintained. Similarly, if the brightness of the screen (110) is already at a minimum value, then it cannot be decreased and is instead maintained. If the brightness of the screen (110) is above the second predetermined brightness, then the brightness of the screen (110) is decreased.

In response to a change in the orientation of the face, for example, turning toward or away from the screen (110), the information processing apparatus (1) increases or decreases the brightness of the screen (110) accordingly.

The posture of the user may be used to provide even greater sensitivity and selectivity over the control of the operating state of the information processing apparatus (1). As described above, it is generally difficult to measure the orientation of the user's face when the user is in an abnormal posture (e.g., abnormal postures (300-313)). When brightness of the screen (110) is being adjusted based on the orientation of the user's face, an incorrect characterization of the orientation of the user's face may cause the brightness of the screen (110) to fluctuate significantly, in particular when the information processing apparatus (1) is repeatedly obtaining the plurality of measured distances with a high sampling frequency. As such, this fluctuation may cause both a disturbance to the user as well as an unnecessary increase power consumption by the information processing apparatus (1).

Therefore, in response to classifying the user's posture as abnormal, the information processing apparatus (1) does not change the operating state but instead maintains the operating state from before the classification of an abnormal posture. However, in response to classifying the user's posture as normal, the information processing apparatus (1) changes the operating state as described above. Continuing with the example of screen (1) brightness, in response to classifying the user's posture as abnormal, the information processing apparatus (1) maintains the brightness of the screen (1). By contrast, in response to classifying the user's posture as normal, the information processing apparatus (1) may increase, decrease, or maintain the brightness of the screen (1) depending on the orientation of the user's face.

Figure 4:
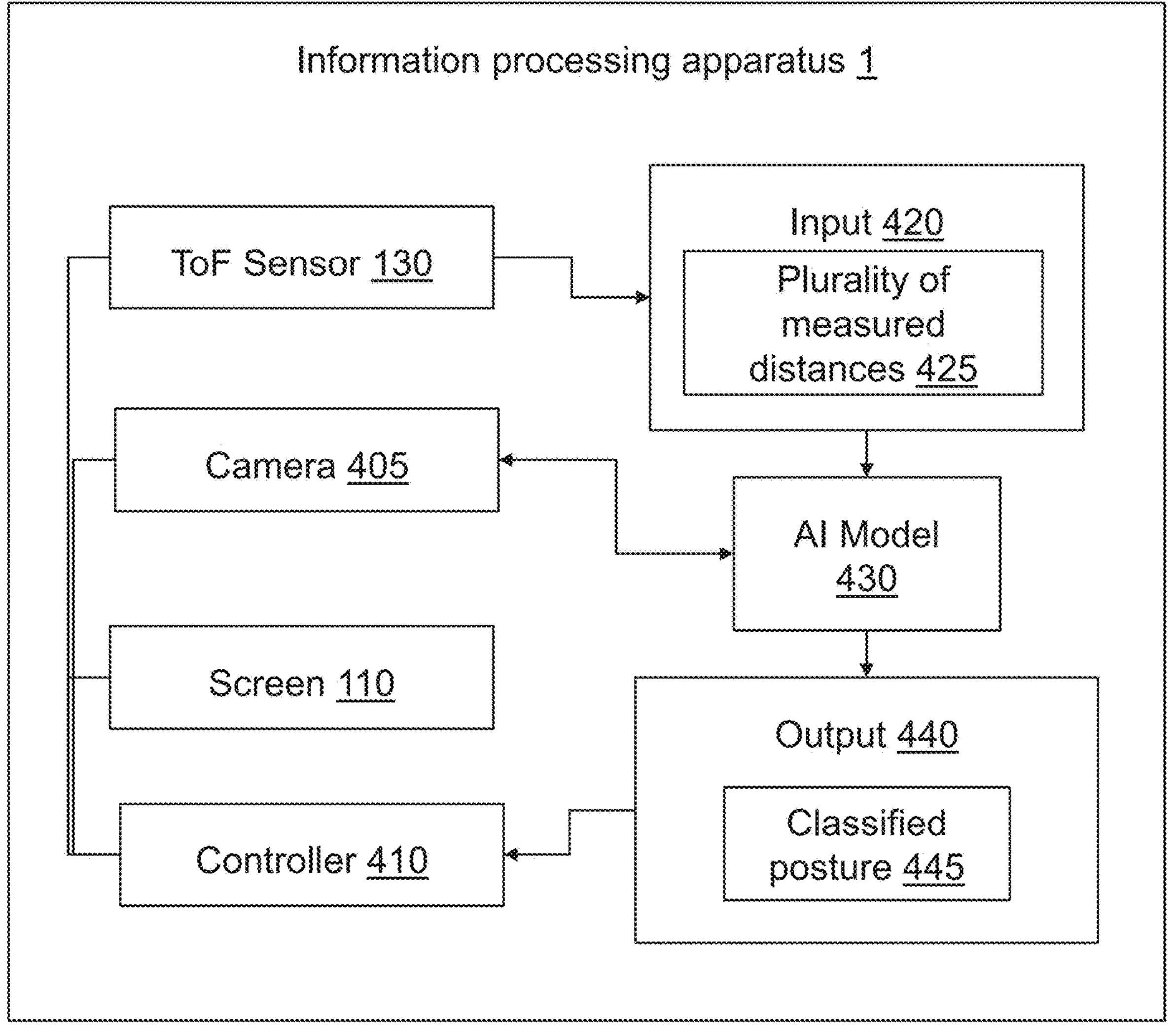
FIG. 4 depicts a block diagram of an information processing apparatus in accordance with one or more embodiments of the disclosure.

FIG. 4 depicts a block diagram of the information processing apparatus (1) in accordance with one or more embodiments. Although several components illustrated in FIG. 1 are not shown in FIG. 4, a person of ordinary skill in the art will appreciate that the information processing apparatus (1) of FIG. 4 may include additional components, including those illustrated in FIG. 1 and described above.

The information processing apparatus (1) includes a controller (410) that controls the operating state of the information processing apparatus (1). The controller (410) encompasses several computer hardware components, including an embedded controller or microcontroller and the main processing unit of the information processing apparatus. The controller (410) further includes a memory, for example a non-transient computer readable medium and/or a random-access memory (RAM). The controller (410) includes one or more central processing units (CPUs), graphics processing units (GPUs), and chipsets. The controller (410) boots the information processing apparatus (1) from the standby to the normal operating state, transitions the information processing apparatus (1) from the normal operating state to the standby state, and transition the information processing apparatus to other states previously described above.

The controller (410) is connected to the ToF sensor (130), the screen (110), and a camera (405) of the information processing apparatus (1). In addition, the controller (410) is connected the power button (140), battery, power supply, user input devices, and other components not shown.

The ToF sensor (130) obtains a plurality of measured distances (425) by measuring a distance to each of a plurality of points within a field of view of the ToF sensor (130). The plurality may be defined by a grid of subareas (e.g., an 8×8 grid, as shown in FIG. 2) or defined another way to provide multiple measurements over the field of view. The controller (410) detects a presence of a user within the field of view of the ToF based on the plurality of measured distances. The presence of a user may be determined when one or more of the plurality of measured distances is less than a predetermined threshold. Such a scenario corresponds to a user being in the field of view of the ToF sensor (130) within a relatively short distance (e.g., less than 1 m). To prevent the misidentification of static objects for users, the presence of a user may be determined by also requiring that one or more of the plurality of measured values changes over a predetermined period of time by an amount greater than another predetermined threshold value.

In accordance with one or more embodiments, the information processing apparatus (1) includes an artificial intelligence (AI) model (430) that is used to classify the posture of the user based on the plurality of measured distances and obtain a classified posture (445). The AI model (430) may be of any model type or architecture known in the art, for example, a convolutional neural network (CNN), a residual network (ResNet), a vision transformer (ViT), or a generative adversarial network (GAN) that includes a discriminator. The input (420) to the AI model (430) includes the plurality of measured distances (425), while the output (440) of the AI model (430) includes the classified posture (445) of the user.

Before being deployed by the information processing apparatus (1) to classify the user's posture and obtain the classified posture (445), the AI model (430) is pretrained using training distance measurements corresponding to a plurality of different users interacting with the information processing apparatus (1) in a plurality of predetermined categories of postures. The different users have different ages, body types, skin tones, and clothing. The categories include normal postures, such as the posture of the user illustrated in FIG. 2 or other postures where the user is positioned square and substantially centred with respect to the ToF sensor (130), and a plurality of abnormal postures, such as those depicted in FIG. 3. The abnormal posture categories may include the user being seated, lying or reclining, standing, positioned with an obstructing object (e.g., food, or a notebook), and with additional users present. The abnormal postures show that the user is interacting with the information processing apparatus (1) but with their body positioned unconventionally.

The classified posture (445) is either normal or abnormal. The classified posture (445) is used as an input to the controller (410) for adjusting the operating state of the information processing apparatus (1) as described in greater detail below. In one or more embodiments, the classified posture may include additional categories, for example, the categories described above with respect to the training distance measurements. By determining a more descriptive characterization of the user's posture, the information processing apparatus (1) may adjust the operating state of the information processing apparatus (1) with greater precision to accommodate the posture of the user.

Adjusting the operating state of the information processing apparatus (1) includes transitioning the information processing apparatus (1) from one operating state to another, for example, from a standby state to a normal operating state, or vise versa. In addition, adjusting the operating state of the information processing apparatus (1) includes adjusting the brightness of the screen (110), that is, maintaining, decreasing, or increasing the brightness of the screen (110). As the operating state of the information processing apparatus (1) is adjusted, the controller (410) may record each adjustment that is made. The record of adjustments may be used for providing the user or manufacturer with diagnostics of the information processing apparatus (1) and for debugging or other maintenance purposes. Thus, although maintaining the brightness of the screen (110) does not include a change in brightness, it is still considered an "adjustment" because it provides an entry to the record of adjustments.

It is emphasized that embodiments of the present disclosure primarily use measurements from the ToF sensor (130) for classifying the posture of the user. As described previously, classifying the posture of the user using the ToF sensor (130) is both faster and more energy efficient than using images obtained by the camera (405) of the information processing apparatus (1). However, images obtained by the camera (405) may be used to validate the classified posture (445) while still improving speed and energy efficiency by only periodically performing the validation. For example, one out of every ten (or one out of every twenty, or thirty, etc.) cycles of obtaining the plurality of distance measurements may include a validation step during which an image is obtained by the camera (405). During the validation cycle, the controller confirms or denies the classified posture (445) by reference to the image. If the classified posture (445) is denied, the validation cycle may repeat until the classified posture (445) is confirmed, or until a predetermined number of validation cycles have been iterated.

In one or more embodiments, the user may retrain the AI model (430) using a plurality of distance measurements obtained with the ToF sensor (130) alongside images simultaneously acquired with the camera (405). The user may manually categorize the retraining distance measurements and images into categories of normal and abnormal postures. Alternatively, the user may provide the paired distance measurements from the ToF sensor (130) and images from the camera (405) to an external server for categorization. The categorized distance measurements and images may then be provided the AI model (430) as a new set of training measurements for retraining that is tailored to the specific user of the information processing device (1).

Figure 5:
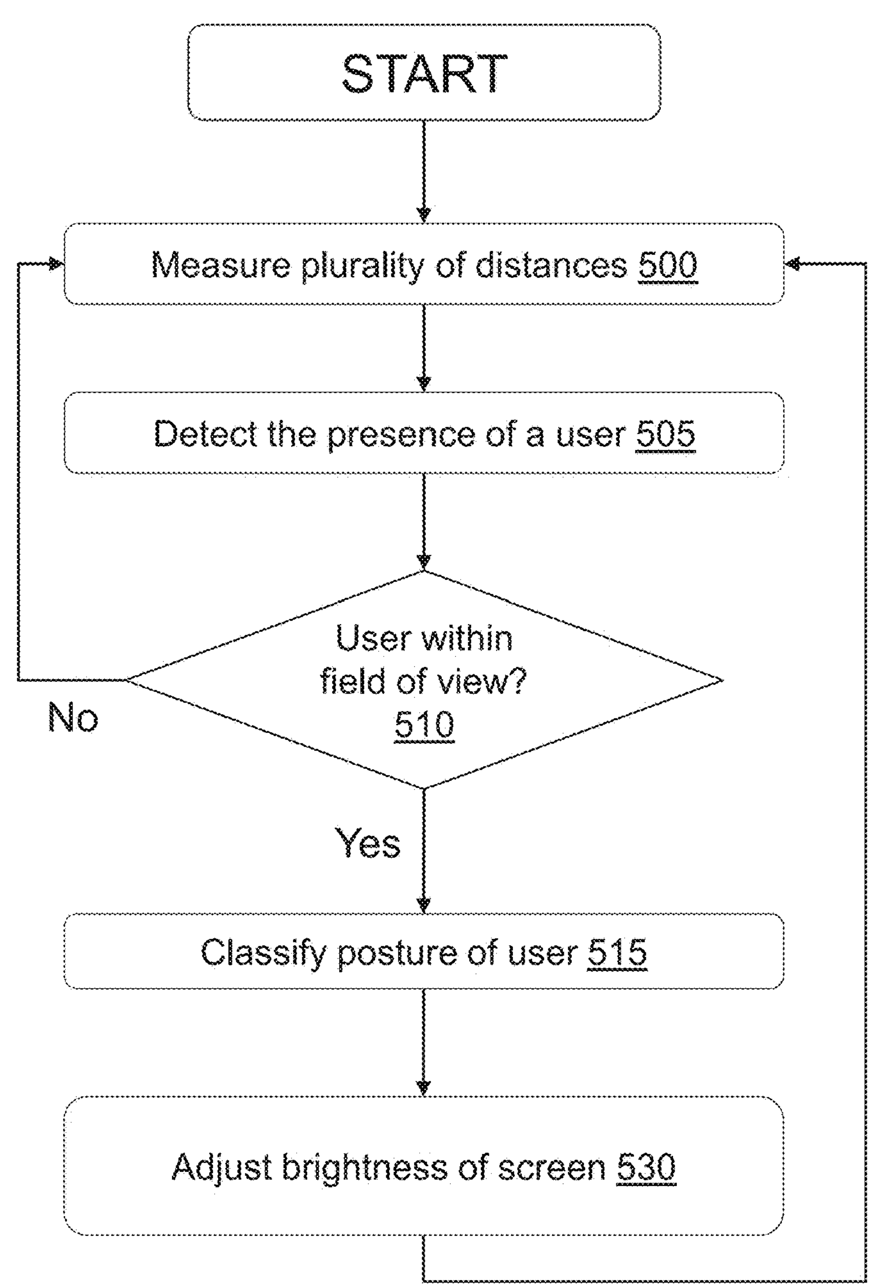
FIG. 5 depicts a method for controlling an information processing apparatus in accordance with one or more embodiments of the disclosure.

FIG. 5 depicts a method in accordance with one or more embodiments. The steps of the method of FIG. 5 can be performed, in part, using the controller (410).

In Step 500, a plurality of measured distances is obtained using the ToF sensor (130) by measuring a distance to each of a plurality of points within an field of view of the ToF sensor (130). Each of the plurality of points correspond to a location within a resolution element of the ToF sensor (130), for example, as depicted in FIG. 2. The ToF sensor (130) may repeatedly obtain the plurality of measured distances with a predetermined sampling frequency (e.g., 1-4 Hz). During each cycle, the controller may store the plurality of measured distances, providing a record over time of measured distances to the plurality of points.

In Step 505, the controller (410) detects a presence of the user within the field of view of the ToF sensor (130). Detecting the presence of the user may include applying a predetermined threshold to the plurality of measured distances. For example, the presence of the user may be detected by calculating whether one or more of the plurality of measured distances is below a predetermined threshold (e.g., 0.5-1 m). Alternatively, or in addition, detecting the presence of the user may also include applying a linear differential operator to the record over time of measured distances to determine a change in one or more of the measured distances that is indicative of motion within the field of view.

In one or more embodiments, the controller (410) calculates a summary statistic based on the plurality of measured distances obtained with the predetermined sampling frequency. That is, the controller (410) calculates the summary statistic based on the record over time of measured distances to the plurality of points. The summary statistic may be the mean, median, standard deviation, or other statistical quantity capable of characterizing the plurality of measured distances obtained with the predetermined sampling frequency. The summary statistic may thereby provide greater stability or accuracy to further derived quantities or decisions by condensing multiple measurements into a single value that characterizes the distribution of distance values. Similarly, the plurality of measured distances obtained with the predetermined sampling frequency, or the record over time of measured distances to the plurality of point, may be binned by a predetermined binning factor before calculating the summary statistic. Subsequently, the controller (410) detects the presence of the user within the field of view of the ToF sensor (130) based on the summary statistic.

In Step 510, the controller (410) determines whether the plurality of measured distances, or the record over time of measured distances, satisfies the criteria for detection. In response to detecting that the user is not present within the field of view of the ToF sensor (130), the method restarts at Step 500, as shown by the arrow labeled "No" pointing away from Step 510 in FIG. 5. Accordingly, a loop including Steps 500-510 may be performed until a user is detected. In response to detecting that the user is present within the field of view of the ToF sensor (130), the method continues to Step 515, as shown by the arrow labeled "Yes" pointing away from Step 510 in FIG. 5.

In Step 515, the controller (410) classifies the posture of the user based on the plurality of measured distances. Continuing from the description above, the controller (410) may also classify the posture of the user based on the calculated summary statistic. The description of FIG. 2 provides a conceptual framework for identifying different aspects and parts of a user, for example, the user's head and their shoulders, based on the plurality of measured distances. As described in reference to FIG. 4, an AI model (430) controlled by the information processing apparatus (1) classifies the posture of the user. The AI model (430) may be a CNN, ResNet, VIT, GAN, or another model, or a combination of model types. The AI model (430) may be pretrained using training distance measurements corresponding to a plurality of different users interacting with the information processing apparatus in a plurality of predetermined categories of postures. By virtue of the pretraining process, the AI model (430) is capable of classifying the posture of user regardless of their physical traits.

Generally, the posture (445) is either normal or abnormal. In one or more embodiments, the classified posture may include additional categories, for example, the categories described above with respect to the training distance measurements described previously. Images obtained by the camera (405) may be used to validate the classified posture (445). For example, a predetermined number of cycles of obtaining the plurality of distance measurements may include a validation step during which an image is obtained by the camera (405). During the validation cycle, the controller (410) confirms or denies the classified posture (445) by reference to the image. The validation cycle may iterate a predetermined number of times or may continue to iterate until the classified posture is confirmed by reference to the image.

In Step 530, the controller (410) adjusts the brightness of the screen (110) of the information processing apparatus (1) based on the posture of the user. Adjusting the brightness of the screen (110) includes maintaining, decreasing, or increasing the brightness of the screen (110). For example, in response to the posture of the user being classified as an abnormal posture, the controller (410) may maintain the brightness of the screen (110). Similarly, in response to the posture of the user being classified as a normal posture, the controller (410) maintains, increases, or decreases the brightness of the screen (110).

The controller (410) may record the adjustments to the screen (110) over time. The record of adjustments may be used for providing the user or manufacturer with diagnostics of the information processing apparatus (1) and for debugging or other maintenance purposes. Accordingly, although maintaining the brightness of the screen (110) does not include a change in brightness, it is still considered an "adjustment" because it provides an entry to the record of adjustments and continues to affect the operation of the information processing apparatus (1).

After Step 530, the method restarts at Step 500, forming a loop. The method of Steps 500-530 may repeat continuously while the user interacts with the information processing apparatus or may be initiated and terminated by the user.

Figure 6:
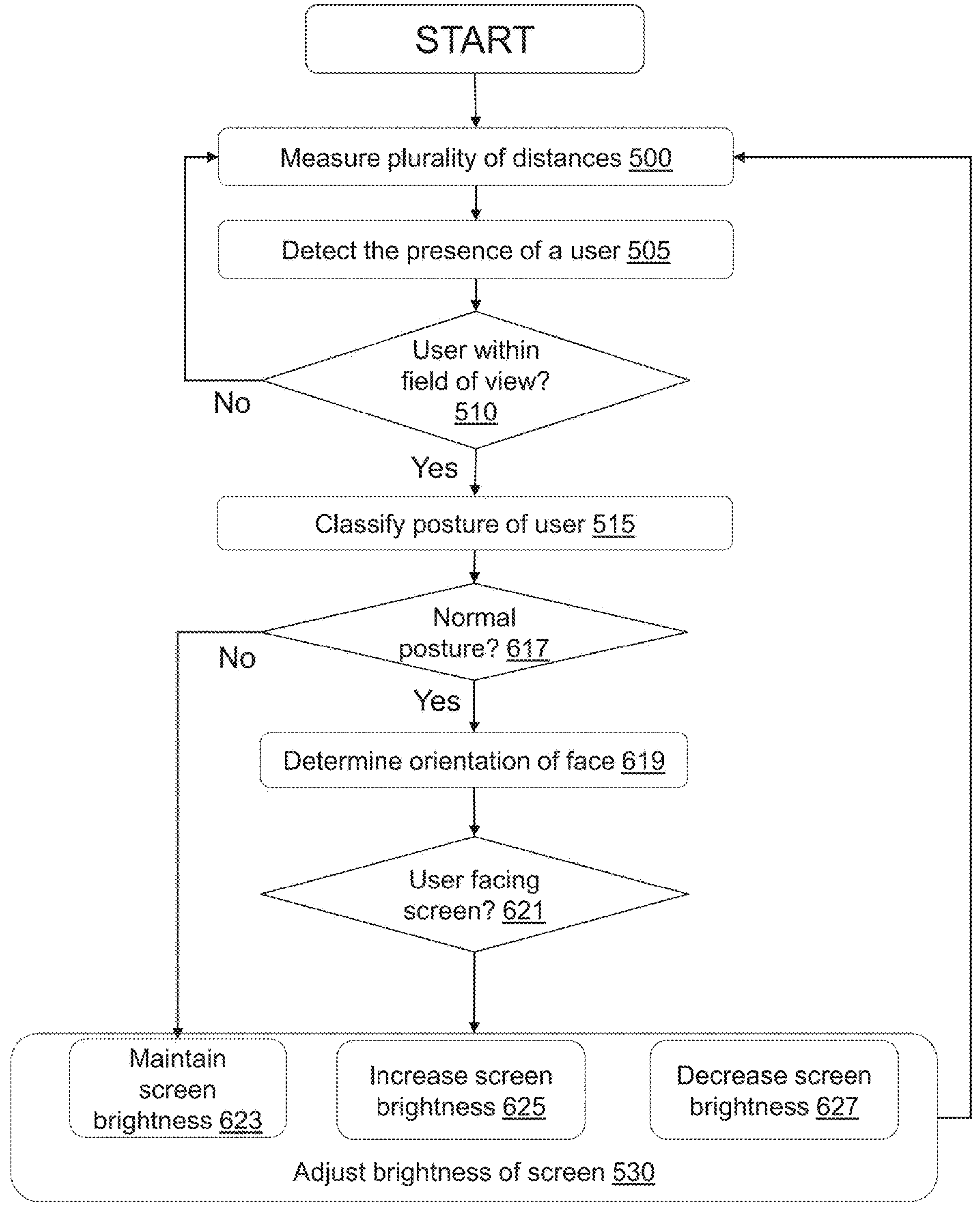
FIG. 6 depicts a method for controlling an information processing apparatus in accordance with one or more embodiments of the disclosure.

FIG. 6 depicts a method in accordance with one or more embodiments. Steps 500, 505, 510, 515, and 530 are substantially the same as the same numbered steps illustrated in FIG. 5. Additional steps are included between Step 515 and Step 530.

In the method illustrated by FIG. 6, Step 515 is followed by Step 617. In Step 617, the controller (410) determines whether the user's posture, as classified by the AI model (430), is normal. As described in reference to FIGS. 2 and 3, a normal posture is a posture where the user is positioned square and substantially centered with respect to the ToF sensor (130), such as the posture of the user illustrated in FIG. 2. Additional characteristics of the user are reliably determined when the user is in a normal posture, for example, the orientation of their face. By contrast, an abnormal posture is one in which the user is interacting with the information processing apparatus (1) but with their body positioned unconventionally. For example, abnormal postures include the user reclining, stretching, or with an obstruction between themselves and the ToF sensor (130).

In response to the in response to the posture of the user being classified as an abnormal posture, as shown by the arrow labeled "No" pointing away from Step 617, the controller (410) adjusts the brightness of the screen at Step 530. Specifically, the controller (410) maintains the brightness of the screen, as shown by Step 623.

In response to the posture of the user being classified as a normal posture, as shown by the arrow labeled "Yes" pointing away from Step 617, the controller (410) determines the orientation of the user's face based on the plurality of measured distances at Step 619. Various descriptions have been provided with regard to determining the orientation of the user's face, for example, the description in reference to FIG. 2.

At Step 621, the controller (410) determines whether the user's face is oriented towards the screen (110) of the information processing apparatus (1). The controller (410) then adjusts the brightness of the screen differently at Step 530 depending on the orientation of the user's face.

More specifically, following Step 621, the controller (410) maintains the brightness of the screen (110) at Step 623 or increases the brightness of the screen at Step 625 in response to determining that the face of the user is oriented toward the screen (110). For example, if the screen (110) is already illuminated to its maximum brightness and the user's face is determined to be oriented towards the screen at Step 621, the controller (410) maintains the brightness of the screen at Step 623. Similarly, if the user was previously facing the screen and new determination of the orientation of their face at Step 621 shows that they have continued to face the screen, then the brightness of controller (410) maintains the brightness of the screen at Step 623. Yet further, the user or manufacturer of the information processing apparatus (1) may configure the information processing apparatus (1) to set the brightness of the screen (110) to a predetermined brightness in response to determining that the face of the user is oriented toward the screen (110). Therefore, if the screen (110) is already at (or even above) the predetermined brightness, then the brightness of the screen (110) is maintained. If the brightness of the screen (110) is below the predetermined brightness, then brightness of the screen (110) is increased.

Alternatively, following Step 621, the controller maintains the brightness of the screen (110) at Step 623 or decreases the brightness of the screen (110) at Step 627 in response to determining that the face of the user is not oriented toward the screen (110). For example, if the screen (110) is already illuminated to its minimum brightness and the user's face is determined to be oriented away from the screen at Step 621, the controller (410) maintains the brightness of the screen at Step 623. Similarly, if the user was previously facing away from the screen and new determination of the orientation of their face at Step 621 shows that they have continued to face away from the screen, then the brightness of controller (410) maintains the brightness of the screen at Step 623. Yet further, the user or manufacturer of the information processing apparatus (1) may configure the information processing apparatus (1) to set the brightness of the screen (110) to a second predetermined brightness in response to determining that the face of the user is oriented away from the screen (110). Therefore, if the screen (110) is already at (or even below) the second predetermined brightness, then the brightness of the screen (110) is maintained. If the brightness of the screen (110) is above the second predetermined brightness, then the brightness of the screen (110) is decreased.

The methods of FIGS. 5 and 6 may be performed iteratively. As described above in Step 500, the ToF sensor (130) may repeatedly obtain the plurality of measured distances with a predetermined sampling frequency. During each cycle, the controller may store the plurality of measured distances, providing a record over time of measured distances to the plurality of points. The steps that follow Step 500 may thus either be performed based upon the measurements obtained within a single cycle or by combining cycles together through the calculation of one or more summary statistics. The number of cycles to be combined in the calculation of the summary statistics may be set by the manufacturer of the information processing apparatus (1) or by the user.

Performing each of Steps 500-530 with the same predetermined sampling frequency with which the plurality of measured distances is obtained provides the greatest cadence and responsiveness of the information processing apparatus. According to embodiments such as these, the ToF sensor (130) obtains the plurality of measured distances at a rate of 1-4 Hz and the controller (410) detects the presence of the user, classifies the posture of the user using the AI model (430), determines the orientation of the face of the user, and adjusts the brightness of the screen (110) based on the posture of the user with the same rate of 1-4 Hz.

By contrast, combining pluralities of measured distances obtained over multiple cycles may improve stability and reliability at the expense of speed. According to embodiments such as these, two or more cycles of obtaining the plurality of distance measurements by the ToF sensor (130) are combined. Subsequently, the controller (410) calculates a summary statistic of the distribution of measured distances and detects the presence of the user based on the summary statistic (e.g., based on the mean distance). Then, the controller (410) classifies the posture of the user using the AI model (430) and determines the orientation of the user's face based on one or more cycles of obtaining the plurality of distance measurements by the ToF sensor (130). Afterwards, the controller adjusts the brightness of the screen (110).

Embodiments of the disclosure have one or more of the following advantages. First, embodiments of the present disclosure include an information processing apparatus (1) that uses a ToF sensor (130) to characterize the user's posture and the orientation of their face. ToF sensors can be operated to obtain distance measurements with high sampling frequencies (e.g., 1-4 Hz) providing improved time efficiency compared to alternative methods. Further, the limited, but sufficient, resolution of ToF sensors improves data processing speeds and energy requirements by reducing memory and processing overhead. In addition, ToF sensors are not sensitive to the ambient lighting and instead provide their own signals (e.g., infrared light signals or ultrasonic signals). Accordingly, even in dim environments, or in the dark, embodiments of the present disclosure may use the ToF sensor (130) to characterize the user's posture and the orientation of their face.

As described above, embodiments of the present disclosure include an information processing apparatus (1) that uses an AI model (430) to classify the posture of the user. Characterizing the posture of the user provides improved sensitivity and selectivity over the control of the operating state of the information processing apparatus (1). For example, some information processing apparatuses disclosed herein are designed to dynamically respond to a user, in particular, based on the user's physical interaction with the information processing apparatus (1). However, it is difficult to accurately characterize the user's physical interaction with the information processing apparatus (1) when the user is in an abnormal posture. Consequently, any adjustment or dynamic response to the user by the information processing apparatus may be unnecessary and degrade user experience or device performance when the user is in an abnormal posture. For example, embodiments of the present disclosure adjust the brightness of a screen (1) depending on the orientation of the user's face. However, incorrectly determining the orientation of the user's face when the user is in an abnormal position may cause the brightness of the screen (110) to fluctuate significantly, in particular when the information processing apparatus (1) is repeatedly obtaining distance measurements with a high sampling frequency. As such, these erroneous characterizations may cause both a disturbance to the user as well as an unnecessary increase power consumption by the information processing apparatus (1). Therefore, in response to classifying the user's posture as abnormal, embodiments of the present disclosure maintain the brightness of the screen until the user is no longer in an abnormal posture.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. An information processing apparatus, comprising:
- a time-of-flight (ToF) sensor that obtains a plurality of measured distances by measuring a distance to each of a plurality of points within a field of view of the ToF sensor;
- a screen; and
- a controller that:
  - detects a presence of a user within the field of view based on the plurality of measured distances;
  - in response to detecting the presence of the user within the field of view:
    - classifies, using an artificial intelligence (AI) model, a posture of the user based on the plurality of measured distances, and
    - adjusts a brightness of the screen based on the posture of the user;
  - in response to classifying the posture of the user as an abnormal posture, maintains a brightness of the screen regardless of the posture of the user; and
  - in response to classifying the posture of the user as a normal posture:
    - determines an orientation of a face of the user based on the plurality of measured distances, and
    - adjusts the brightness of the screen based on the orientation of the face of the user.

2. The information processing apparatus of claim 1, wherein the ToF sensor repeatedly obtains the plurality of measured distances with a predetermined sampling frequency.

3. The information processing apparatus of claim 2, wherein, with the predetermined sampling frequency, the controller:

detects the presence of the user within the field of view of the ToF sensor;

classifies the posture of the user; and adjusts the brightness of the screen based on the posture of the user.

4. The information processing apparatus of claim 2, wherein the controller:

calculates a summary statistic based on the plurality of measured distances obtained with the predetermined sampling frequency, wherein the summary statistic is selected from a group consisting of mean, median, and mode;

detects the presence of the user within the field of view based on the summary statistic; and in response to detecting the presence of the user within the field of view, classifies the posture of the user based on the summary statistic.

5. The information processing apparatus of claim 2, wherein the controller:

calculates a change in one of the plurality of measured distances by applying a linear differential operator to the plurality of measured distances obtained repeatedly with the predetermined sampling frequency, wherein the change indicates motion within the field of view, and detects the presence of the user within the field of view based on the calculated change.

6. The information processing apparatus of claim 1, wherein the AI model is pretrained using training distance measurements corresponding to a plurality of different users interacting with the information processing apparatus in a plurality of predetermined categories of postures.

7. The information processing apparatus of claim 6, further comprising a camera that obtains an image of the user, wherein the controller validates the posture of the user based on the image of the user.

8. A method, comprising:

obtaining, using a time-of-flight (ToF) sensor of an information processing apparatus, a plurality of measured distances by measuring a distance to each of a plurality of points within a field of view of the ToF sensor;

detecting a presence of a user within the field of view of the ToF sensor based on the plurality of measured distances;

in response to detecting the presence of the user within the field of view:

classifying, using an artificial intelligence (AI) model, a posture of the user based on the plurality of measured distances; and adjusting a brightness of a screen of the information processing apparatus based on the posture of the user;

in response to classifying the posture of the user as an abnormal posture, maintaining a brightness of the screen regardless of the posture of the user; and in response to classifying the posture of the user as a normal posture:

determining an orientation of a face of the user based on the plurality of measured distances, and adjusting the brightness of the screen based on the orientation of the face of the user.

9. The method of claim 8, further comprising repeatedly obtaining, using the ToF sensor, the plurality of measured distances with a predetermined sampling frequency.

10. The method of claim 9, further comprising, with the predetermined sampling frequency:

detecting the presence of the user within the field of view of the ToF sensor;

classifying the posture of the user; and adjusting the brightness of the screen based on the posture of the user.

11. The method of claim 9, further comprising:

calculating a summary statistic based on the plurality of measured distances obtained with the predetermined sampling frequency, wherein the summary statistic is selected from a group consisting of mean, median, and mode;

detecting the presence of the user within the field of view based on the summary statistic; and in response to detecting the presence of the user within the field of view, classifying the posture of the user based on the summary statistic.

12. The method of claim 9, further comprising:

calculating a change in one of the plurality of measured distances by applying a linear differential operator to the plurality of measured distances obtained repeatedly with the predetermined sampling frequency, wherein the change indicates motion within the field of view, and detecting the presence of the user within the field of view based on the calculated change.

13. The method of claim 8, wherein the AI model is pretrained using training distance measurements corresponding to a plurality of different users interacting with the information processing apparatus in a plurality of predetermined categories of postures.

14. The method of claim 13, further comprising obtaining an image of the user by a camera of the information processing apparatus and validating the posture of the user based on the image of the user.

* * * * *